(12) United States Patent
Furihata et al.

(10) Patent No.: US 9,560,250 B2
(45) Date of Patent: Jan. 31, 2017

(54) INFORMATION PROCESSING APPARATUS, MEASUREMENT SYSTEM, CONTROL SYSTEM, LIGHT AMOUNT DETERMINATION METHOD AND STORAGE MEDIUM

(71) Applicant: CANON KABUSHIKI KAISHA, Tokyo (JP)

(72) Inventors: Hisayoshi Furihata, Tokyo (JP); Masakazu Fujiki, Kawasaki (JP); Masahiro Suzuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 330 days.

(21) Appl. No.: 14/310,238

(22) Filed: Jun. 20, 2014

(65) Prior Publication Data
US 2015/0002662 A1   Jan. 1, 2015

(30) Foreign Application Priority Data
Jun. 26, 2013 (JP) ................................ 2013-134203

(51) Int. Cl.
H04N 7/18 (2006.01)
H04N 5/225 (2006.01)
H04N 5/235 (2006.01)

(52) U.S. Cl.
CPC .......... *H04N 5/2256* (2013.01); *H04N 5/2351* (2013.01); *H04N 5/2354* (2013.01)

(58) Field of Classification Search
USPC ....................................................... 348/136
See application file for complete search history.

(56) References Cited

U.S. PATENT DOCUMENTS 4,905,034 A * 2/1990 Tejima ..................... G01C 3/08
                                                           250/201.4
6,658,170 B1  12/2003 Nakatani et al.
(Continued)

FOREIGN PATENT DOCUMENTS

| JP | 2000-241131 A | 9/2000 |
| JP | 3884321 B2    | 2/2007 |
| JP | 4077754 B2    | 4/2008 |

OTHER PUBLICATIONS

Tsai, "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, pp. 323-344.

(Continued)

*Primary Examiner* — Leron Beck
(74) *Attorney, Agent, or Firm* — Fitzpatrick, Cella, Harper & Scinto

(57) ABSTRACT

There is provided with an information processing apparatus. Location information indicating an approximate location of a measurement target relative to a projection apparatus is obtained. The projection apparatus projects, onto the measurement target, projection light of a predetermined pattern composed of light rays travelling in respective directions. For respective travelling directions, incident regions of the measurement target on which the projection light is incident are estimated in accordance with the location information. Amounts of the projection light toward the respective travelling directions are determined such that light amounts of reflected light from the estimated incident regions toward an image capturing apparatus fall within a predetermined range. The image capturing apparatus captures an image of the measurement target onto which the projection light has been projected.

14 Claims, 6 Drawing Sheets

(56) References Cited

U.S. PATENT DOCUMENTS

| | | |
|---|---|---|
| 6,876,392 B1 | 4/2005 | Uomori et al. |
| 7,031,535 B2 | 4/2006 | Yamamoto |
| 7,092,563 B2 | 8/2006 | Shiratani |
| 7,239,347 B2 | 7/2007 | Yamamoto et al. |
| 7,388,679 B2 | 6/2008 | Yoshino et al. |
| 7,432,909 B2 | 10/2008 | Yamamoto et al. |
| 7,522,195 B2 | 4/2009 | Yamamoto et al. |
| 8,082,573 B2 | 12/2011 | Miyamoto et al. |
| 8,320,696 B2 | 11/2012 | Yamamoto et al. |
| 8,970,853 B2 | 3/2015 | Takabayashi et al. |
| 9,046,364 B2 | 6/2015 | Kojo et al. |
| 9,339,254 B2 | 5/2016 | Wanda |
| 9,412,338 B2 | 8/2016 | Seo et al. |
| 2014/0196544 A1 | 7/2014 | Wanda |
| 2014/0285541 A1 | 9/2014 | Seo et al. |
| 2015/0012244 A1 | 1/2015 | Oki |

OTHER PUBLICATIONS

Kimura, et al., "Projector Calibration using Arbitrary Planes and Calibrated Camera," IEEE, 2007.

* cited by examiner

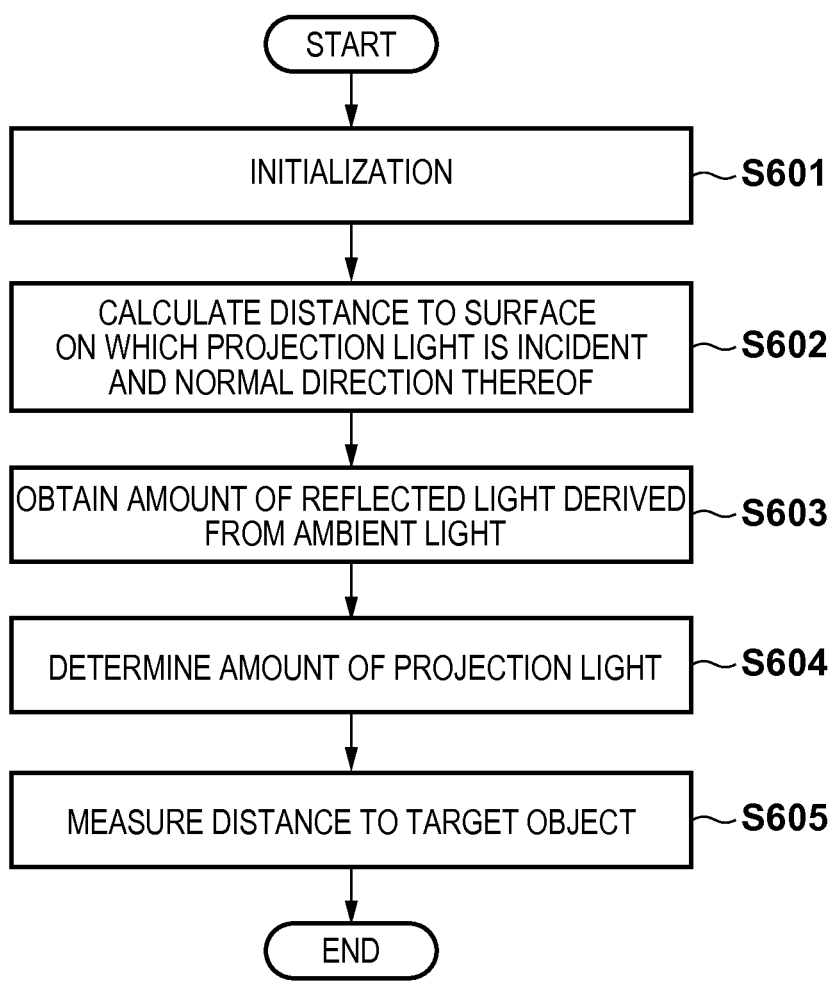

INFORMATION PROCESSING APPARATUS, MEASUREMENT SYSTEM, CONTROL SYSTEM, LIGHT AMOUNT DETERMINATION METHOD AND STORAGE MEDIUM

BACKGROUND OF THE INVENTION

Field of the Invention

The present invention relates to a technique to determine an amount of projection light in a measurement system.

Description of the Related Art

A technique for three-dimensional measurement of an object is known as an important technical element in the field of machine vision. One method of the three-dimensional measurement technique is an active method in which a distance is measured by projecting light onto a target object and measuring reflected light. As one example, there is a method of projecting two-dimensional pattern light onto a target object and capturing an image of corresponding reflected light (projection image) with a camera. In this method, the location of the projection image in the captured image is detected by referring to the characteristics of the two-dimensional pattern light. Then, with the use of the travelling direction of the pattern light and the direction of detection of the projection image, the distance is triangulated.

With the active method, higher contrast of the projection image in the captured image leads to more improvements in the location detection performance and realization of stable and high-accuracy distance measurement. It is thus desirable that the reflected light from the target object be within the dynamic range of a camera and be as intense as possible within this range.

Japanese Patent Laid-Open No. 2000-241131 describes obtainment of an average distance to a target object using a distance sensor and determination of the intensity of projection light based on the obtained distance. More specifically, according to the description of this document, the amount of projection light is increased if the distance from a projection apparatus to the target object is long, and decreased if the distance is short.

SUMMARY OF THE INVENTION

According to an embodiment, an information processing apparatus comprises: a location information obtaining unit configured to obtain location information indicating an approximate location of a measurement target relative to a projection apparatus, wherein the projection apparatus is configured to project, onto the measurement target, projection light of a predetermined pattern composed of light rays travelling in respective directions; and a determination unit configured to estimate, for respective travelling directions, incident regions of the measurement target on which the projection light is incident in accordance with the location information, and determine amounts of the projection light toward the respective travelling directions such that light amounts of reflected light from the estimated incident regions toward an image capturing apparatus fall within a predetermined range, wherein the image capturing apparatus is configured to capture an image of the measurement target onto which the projection light has been projected.

According to another embodiment, an information processing method comprises: obtaining location information indicating an approximate location of a measurement target relative to a projection apparatus, wherein the projection apparatus is configured to project, onto the measurement target, projection light of a predetermined pattern composed of light rays travelling in respective directions; estimating, for respective travelling directions, incident regions of the measurement target on which the projection light is incident in accordance with the location information; and determining amounts of the projection light toward the respective travelling directions such that light amounts of reflected light from the estimated incident regions toward an image capturing apparatus fall within a predetermined range, wherein the image capturing apparatus is configured to capture an image of the measurement target onto which the projection light has been projected.

According to still another embodiment, a non-transitory computer-readable storage medium stores a program for causing a computer to: obtain location information indicating an approximate location of a measurement target relative to a projection apparatus, wherein the projection apparatus is configured to project, onto the measurement target, projection light of a predetermined pattern composed of light rays travelling in respective directions; estimate, for respective travelling directions, incident regions of the measurement target on which the projection light is incident in accordance with the location information; and determine amounts of the projection light toward the respective travelling directions such that light amounts of reflected light from the estimated incident regions toward an image capturing apparatus fall within a predetermined range, wherein the image capturing apparatus is configured to capture an image of the measurement target onto which the projection light has been projected.

Further features of the present invention will become apparent from the following description of exemplary embodiments (with reference to the attached drawings).

BRIEF DESCRIPTION OF THE DRAWINGS

FIG. 6 is a flowchart of processing according to the fifth embodiment.

DESCRIPTION OF THE EMBODIMENTS

The method according to Japanese Patent Laid-Open No. 2000-241131 adjusts the intensity of two-dimensional pattern light uniformly based on one distance value. As the amount of reflected light from a target object is not uniform, there are cases where an optimal amount of reflected light is not obtained from a part of the target object. Therefore, there are still challenges to performing stable and high-accuracy distance measurement.

According to an embodiment of the present invention, high accuracy can be realized in a stable manner in measuring the distance to a target object using an active method.

The following describes embodiments of the present invention with reference to the drawings. It should be noted that the scope of the present invention is not limited to the embodiments described below.

First Embodiment

In the first embodiment, a description is given of an apparatus that measures the distance to a target object using an image capturing apparatus and a projection apparatus that is capable of designating a light amount of projection light on a direction-by-direction basis. It should be noted that a light amount of projection light (hereinafter referred to as an amount of projection light) is determined such that a light amount of reflected light (hereinafter referred to as an amount of reflected light) from a projection image on the target object to the image capturing apparatus falls within a predetermined range.

In the present embodiment, it is assumed that the target object is a diffuse reflection object, which turns light incident thereon into reflected light that diffuses evenly regardless of the direction. The relationship between the amount of projection light onto the diffuse reflection object and the amount of reflected light depends on the distance from the projection apparatus and the image capturing apparatus to a surface onto which light is projected, and on the incident (or reflection) angle of light with respect to this surface. In view of this, in the present embodiment, the distance from the optical center of the projection apparatus to a surface of the target object onto which light is projected, as well as the incident angle of light with respect to this surface, is calculated. Then, the amount of projection light is determined such that the amount of reflected light, which is calculated in accordance with the calculated distance and angle, is equal to a predetermined light amount. In the present embodiment, it is assumed that a shape model of the target object, as well as approximate values of the location and orientation of the target object relative to the projection apparatus, is known in advance.

Figure 1:
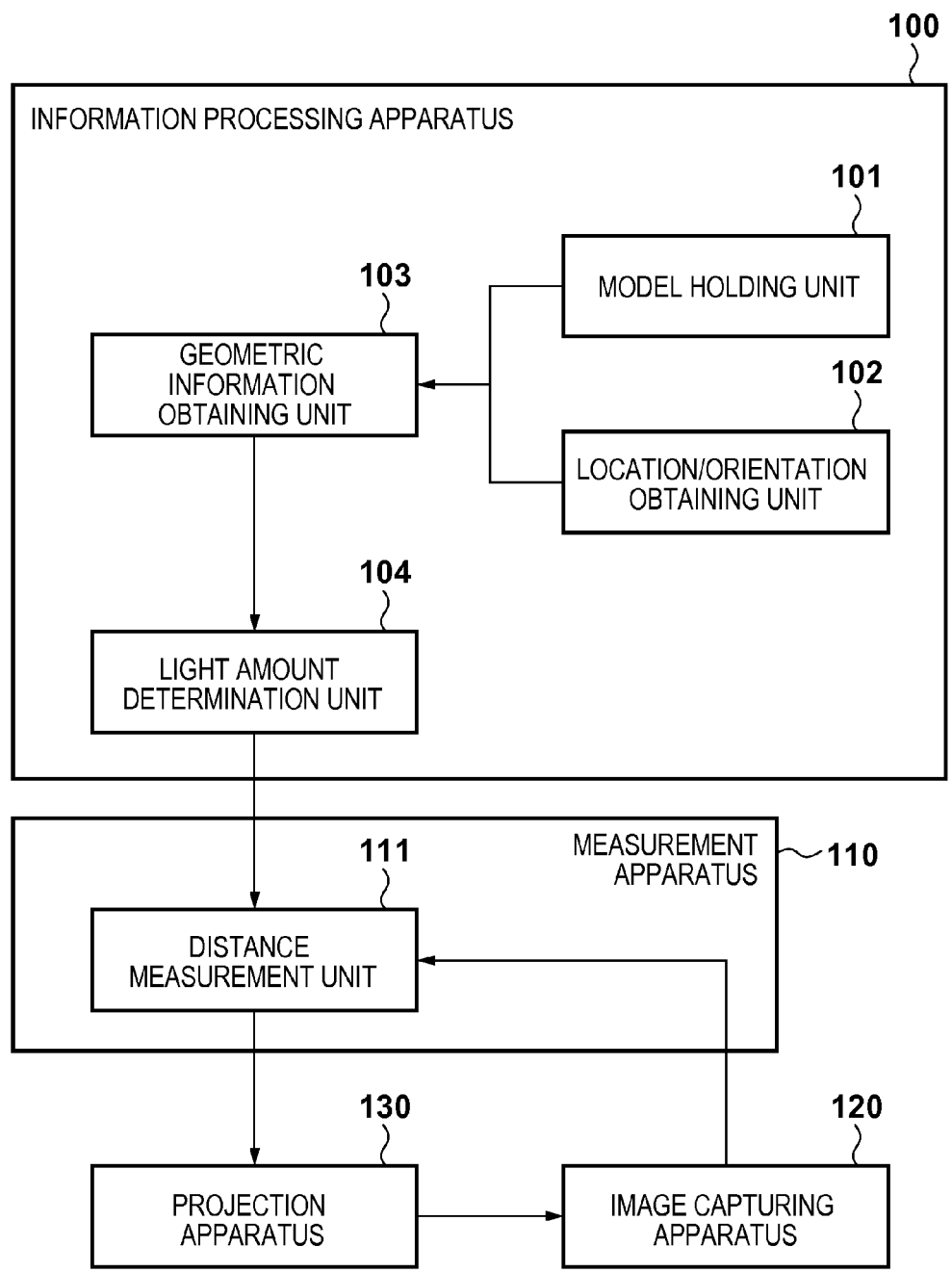
FIG. 1 shows a configuration of an information processing apparatus according to a first embodiment.

FIG. 1 shows a configuration of an information processing apparatus 100 according to the present embodiment. The information processing apparatus 100 includes a model holding unit 101, a location/orientation obtaining unit 102, a geometric information obtaining unit 103, and a light amount determination unit 104. Also, the information processing apparatus 100 is connected to a measurement apparatus 110. This measurement apparatus 110 includes a distance measurement unit 111. Also, the measurement apparatus 110 is connected to an image capturing apparatus 120 and a projection apparatus 130. The information processing apparatus 100 notifies a measurement system including the distance measurement unit 111, the image capturing apparatus 120 and the projection apparatus 130 of a light amount of projection light from the projection apparatus 130. It should be noted that the measurement apparatus 110 may include the information processing apparatus 100, or include at least one of the image capturing apparatus 120 and the projection apparatus 130. Also, the information processing apparatus 100, the distance measurement unit 111, the image capturing apparatus 120 and the projection apparatus 130 may constitute the measurement system.

Components of the information processing apparatus 100 and the distance measurement unit 111 may be designed as dedicated hardware, or may be realized by a computer. For example, in a computer provided with a processor and a memory, a program for realizing later-described steps is obtained from a storage medium, the program is deployed to the memory, and the processor operates in compliance with the deployed program. In this manner, the operations of at least one of the components of the information processing apparatus 100 and the distance measurement unit 111 can be realized.

The model holding unit 101 holds model information indicating the shape of a target object. The model information may be a shape model based on a three-dimensional CAD, or may be a polygon model based on polygonal elements used in the field of computer graphics. In the present embodiment, the model information may be any information that indicates the shape of a surface of the target object. For example, the model information may be point group data indicating the locations of points on the surface of the target object. In this case, a polygon model composed of a plurality of triangular meshes can be obtained by connecting the points indicated by the point group data. This polygon model can be used as a shape model.

The location/orientation obtaining unit 102 obtains information indicating an approximate location of the target object relative to the projection apparatus 130. In the present embodiment, it is assumed that the approximate location and orientation of the target object is known in advance, and corresponding location/orientation information can be obtained. For example, in the case where the arrangement of the target object relative to the projection apparatus 130 is roughly known, location/orientation information corresponding to this arrangement can be obtained. Furthermore, by obtaining the arrangement of the target object relative to a reference point, such as the image capturing apparatus 120, the location and orientation of the target object relative to the projection apparatus 130 can be discovered based on the relationship between the location/orientation of the projection apparatus 130 and the location/orientation of the reference point. In this way, the model holding unit 101 and the location/orientation obtaining unit 102 obtain location information indicating the approximate shape, location and orientation of the target object.

As another example, there is a model fitting method of obtaining the location and orientation of the target object relative to the image capturing apparatus 120 based on the result of positionally fitting the shape model to an image captured by the image capturing apparatus 120. For example, the location and orientation can be calculated by fitting the shape model to edge characteristics extracted from a captured grayscale image. As still another example, the location and orientation of the target object relative to the image capturing apparatus 120 can be obtained by searching an image (for example, a grayscale image) captured by the image capturing apparatus 120 for the target object using a pattern matching method. In this case, by further referring to a relative relationship between the location/orientation of the image capturing apparatus 120 and the location/orientation of the projection apparatus 130, the location and orientation of the target object relative to the image capturing apparatus 120 can be converted into the location and orientation of the target object relative to the projection apparatus 130.

Moreover, the location and orientation of the target object relative to the projection apparatus 130 may be calculated using a model fitting method of positionally fitting the shape model to a distance point group corresponding to a distance obtained through preliminary distance measurement. In this case, as a method of preliminary distance measurement, it is possible to use a method of projecting a pattern image of a predetermined light amount, for example, a pattern image of a uniform light amount onto the target object and calculating a distance in a manner similar to a later-described method. Furthermore, as a method of not using the image capturing apparatus 120, it is possible to provide a six degrees-offreedom sensor to the target object and obtain values output from the sensor as location/orientation information.

The geometric information obtaining unit 103 estimates at least one of the distance from the optical center or the location of the principal point of the projection apparatus 130 to a point on the target object on which the projection light is incident, and the incident angle of the projection light with respect to a surface of the target object at this point. In the present embodiment, it is assumed that the geometric information obtaining unit 103 estimates the distance and incident angle. The distance and incident angle are calculated for each of the travelling directions of the projection light based on the shape model of the target object obtained from the model holding unit 101 and on the location and orientation obtained from the location/orientation obtaining unit 102. As will be described later, the projection apparatus 130 projects a projection image. The geometric information obtaining unit 103 can calculate the distance and incident angle for each of the travelling directions corresponding to pixels in the projection image.

In the present embodiment, geometric information indicates a geometric relationship between the location of the projection apparatus 130 or the image capturing apparatus 120 and the location of a point on the target object. More specifically, the geometric information may indicate one or both of the distance from the optical center of the projection apparatus 130 to a region of the target object on which the projection light is incident, and the angle of the region of the target object with respect to the optical axis of the projection apparatus 130 or a ray of projection light (hereinafter, the region of the target object on which the projection light is incident is referred to as an incident region, and the incident region includes a point on the target object at which the projection light is incident or a local region around that point). The geometric information obtaining unit 103 can calculate geometric information for a point on the target object corresponding to the incident region of the projection light. In the present embodiment, the geometric information obtaining unit 103 can calculate geometric information based on the location and orientation obtained from the location/orientation obtaining unit 102.

The light amount determination unit 104 determines the amount of projection light for each of the travelling directions of the projection light using the distance or incident angle calculated by the geometric information obtaining unit 103. More specifically, the amount of projection light is determined such that a light amount of reflected light obtained from the projection image falls within a predetermined range. While the light amount determination unit 104 determines the amount of projection light using the distance and incident angle calculated by the geometric information obtaining unit 103 in the present embodiment, it is not essential to use both of the distance and incident angle.

The distance measurement unit 111 causes the projection apparatus 130 to project a projection pattern compliant with the light amount determined by the light amount determination unit 104. The distance measurement unit 111 then measures the distance from the projection apparatus or the image capturing apparatus to the measurement target using an image captured by the image capturing apparatus 120. More specifically, the distance measurement unit 111 triangulates distances to points on the target object by associating coordinates in the image captured by the image capturing apparatus 120, which includes the projection image, with the projection pattern. It should be noted that the origin of the distances is not limited to a specific origin, and either the distances from the projection apparatus or the distances from the image capturing apparatus may be calculated. Furthermore, the distance from one point on a supporting member to which the projection apparatus or the image capturing apparatus is attached may be calculated. In the present embodiment that makes use of triangulation, the relationship between the location of the projection apparatus and the location of the image capturing apparatus is known in advance, and calculating the distance from one of the projection apparatus and the image capturing apparatus has the same meaning as determining the distance from the other.

The image capturing apparatus 120 is capable of capturing an image of the target object, and can be, for example, a camera that captures a two-dimensional image of the target object. As will be described later, the image capturing apparatus 120 captures an image of the target object onto which the projection light has been projected by the projection apparatus 130. The two-dimensional image obtained by the image capturing apparatus 120 may be a grayscale image or a color image. In the present embodiment, it is assumed that the image capturing apparatus 120 obtains a grayscale image. The information processing apparatus 100 can access internal parameters of the image capturing apparatus 120, such as parameters corresponding to the focal length, the location of the principal point, and lens distortion. These internal parameters can be calculated using known methods. One example of such known methods is a method described in R. Y. Tsai, "A versatile camera calibration technique for high-accuracy 3D machine vision metrology using off-the-shelf TV cameras and lenses", IEEE Journal of Robotics and Automation, vol. RA-3, no. 4, 1987.

The projection apparatus 130 is capable of projecting projection light of a predetermined pattern onto the measurement target. In the present embodiment, the projection light is composed of light rays travelling in respective directions; more specifically, the projection light can be obtained by projecting a projection image including a predetermined two-dimensional distance measurement pattern. The projection apparatus 130 can be, for example, a projector that projects the projection image. The distance measurement pattern included in the projection image may be a grayscale pattern or a color pattern. In the present embodiment, it is assumed that the projection apparatus 130 projects a grayscale image. The information processing apparatus 100 can access internal parameters of the projection apparatus 130, such as parameters corresponding to the focal length, the location of the principal point, and lens distortion. These internal parameters can be calculated using known methods. One example of such known methods is a method described in M, Kimura, "Projector Calibration using Arbitrary Planes and Calibrated Camera", Computer Vision and Pattern Recognition, CVPR, 2007.

Figure 2:
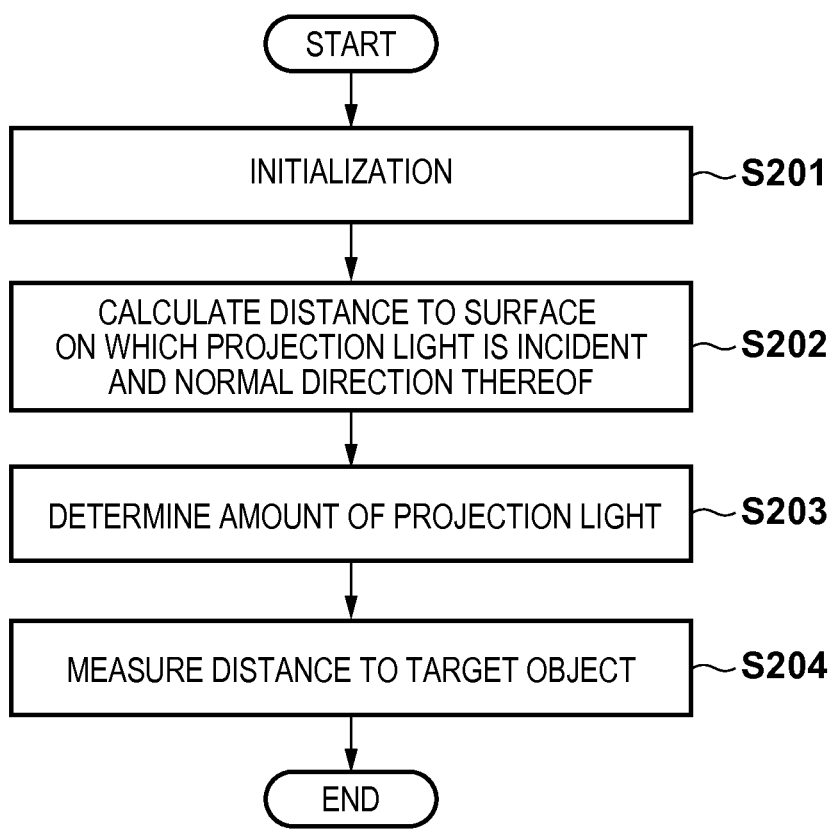
FIG. 2 is a flowchart of processing according to the first embodiment.

A processing procedure according to the present embodiment will now be described. FIG. 2 is a flowchart showing a processing procedure according to the present embodiment.

In step S201, as an initialization operation, data necessary for processing according to the present embodiment is obtained. More specifically, the shape model of the target object is read into the information processing apparatus 100 and held in the model holding unit 101. Also, the location/orientation obtaining unit 102 obtains location/orientation information of the target object. Furthermore, the light amount determination unit 104 obtains internal parameters of both of the image capturing apparatus 120 and the projection apparatus 130, as well as relative locations and orientations thereof.

In step S202, the geometric information obtaining unit 103 obtains the distance to a point on the target object on which the projection light is incident, as well as a normal direction of a surface of the target object at this point, using the shape model and the location/orientation information of the target object obtained in step S201. This calculation can be carried out by arranging the projection apparatus 130 and the shape model in a virtual space in compliance with the location/orientation information, and tracking a light ray from the projection apparatus 130. As one specific example, the geometric information obtaining unit 103 can obtain coordinates of a point of intersection between a straight line extending from the projection apparatus 130 in the travelling direction of the projection light and a surface of the shape model. This point of intersection represents the estimated incident location of the projection light with respect to the target object. If there are a plurality of points of intersection, a point of intersection that is closest to the projection apparatus 130 is used as a point on the target object. The geometric information obtaining unit 103 then obtains the distance from the optical center of the projection apparatus 130 to this point of intersection. The geometric information obtaining unit 103 also obtains a normal direction of a surface of the shape model at this point of intersection. Then, using the obtained normal direction and the incident direction of the projection light with respect to this point of intersection, the geometric information obtaining unit 103 obtains the direction in which the projection light is incident (incident angle) with respect to the normal direction.

In step S202, the geometric information obtaining unit 103 obtains the distance and incident angle for each of the travelling directions of the projection light. For example, the geometric information obtaining unit 103 can obtain the distance and incident angle for each of the travelling directions corresponding to pixels in the projection image projected by the projection apparatus 130. Below, coordinates of a given pixel in the projection image projected by the projection apparatus 130 are noted as (u, v), the distance to the shape model in the direction corresponding to (u, v) is noted as L (u, v), and the incident angle with respect to the shape model in the direction corresponding to (u, v) is noted as e (u, v).

In step S203, the light amount determination unit 104 determines the amount of projection light. Specifics of the process of step S203 will now be described. First, a description is given of a reflection model of a diffuse reflection object. It will be assumed that the projection light is a light source whose light amount attenuates with distance, for example, a point light source. The relationship between the amount of projection light P incident on a projection surface of the diffuse reflection object and the amount of reflected light R from the projection surface of the diffuse reflection object can be defined by expression (1). In expression (1), θ is the incident angle of the projection light, L is the distance from the light source to the projection surface, and K is a parameter unique to the target object, where K is a constant obtained by multiplying the diffuse reflectance of the object surface by the attenuation rate with respect to the distance L and indicates the magnitude of the reflectance at the incident location.

[Math 1]
$$R = \frac{K \cdot \cos\theta}{L^2} \cdot P \quad (1)$$

The projection apparatus 130 projects a projection image including a distance measurement pattern onto the target object. Also, the image capturing apparatus 120 observes reflected light from the projection image as an intensity value of the captured image. Below, the intensity value of the projection image required for the projection apparatus 130 to project light of the light amount P is noted as p, whereas the intensity value obtained from the captured image when the image capturing apparatus 120 has observed reflected light of the light amount R is noted as r. Provided that P is proportional to p and R is proportional to r, expression (2) can be derived from expression (1) by substituting p and r for P and R, respectively.

[Math 2]
$$r = \frac{k \cdot \cos\theta}{L^2} \cdot p \quad (2)$$

In expression (2), k is a constant of proportionality corresponding to K in expression (1). It will be assumed that the constant k is obtained in advance. For example, the constant k can be calculated in the following manner using an object made of the same material as the target object, or an object that is similar to the target object in terms of reflection characteristics (hereinafter referred to as a reference object 1). That is to say, the reference object 1 is arranged such that the projection light from the projection apparatus 130 is incident on a point on the reference object 1 at an incident angle of θ0, the point being distanced from the projection apparatus 130 by a distance of L0. The intensity value of reflected light that is observed in the captured image obtained by the image capturing apparatus 120 when the projection apparatus 130 has emitted a projection image with an intensity value of p0 is noted as r0. The constant k can be obtained by substituting these values r0, p0, L0 and θ0 into expression (2).

The intensity value of a pixel at coordinates (u, v) in the projection image projected by the projection apparatus 130 is noted as p (u, v). Also, it will be assumed that the reflected light obtained as a result of reflection of the projection light corresponding to the pixel at coordinates (u, v) off the target object is observed by the image capturing apparatus 120 as a pixel with an intensity value of r (u, v). In this case, expression (3) can be derived from expression (2).

[Math 3]
$$r(u, v) = \frac{k \cdot \cos(\theta(u, v))}{L(u, v)^2} \cdot p(u, v) \quad (3)$$

As is apparent from expression (3), a change in the distance L or the incident angle θ leads to a change in the intensity value r (u, v) of the reflected light observed by the image capturing apparatus 120, even if the intensity value p (u, v) of the projection image remains the same. By adjusting the intensity value p (u, v) of the projection image in accordance with the distance L or the incident angle θ, the reflected light can be observed as a predetermined intensity value r (u, v). Now, assume that the reflected light to be observed has an intensity value of N. Here, expression (4) can be derived from expression (3) by substituting N for the intensity value r (u, v) of the reflected light and transforming the expression for p (u, v). The intensity value p (u, v) of the projection light can be calculated using expression (4). The light amount determination unit 104 determines the amount of projection light in accordance with expression (4) such that the light amount of reflected light from the projection image falls within a predetermined range. This predetermined range can be set near the upper limit of the dynamic range of the image capturing apparatus 120. In the present embodiment, the light amount determination unit 104 determines the amount of projection light in accordance with expression (4) such that the reflected light from the projection image is observed as a predetermined intensity value N.

[Math 4]

$$p(u, v) = \frac{L(u, v)^2}{k \cdot \cos(\theta(u, v))} \cdot N \quad (4)$$

A method of setting the predetermined intensity value N is not limited to a specific method. For example, in order to capture the projection image at the highest contrast possible, the intensity value equivalent to the upper limit value of the dynamic range of the image capturing apparatus 120 can be set as the intensity value N. Alternatively, a fixed value that is set by a user in advance may be used as the intensity value N. When the amount of projection light thus determined is used in the actual projection, the light amount of the reflected light from the projection image is observed as an intensity value near the intensity value N.

When the target object exists in the travelling direction of the projection light and the distance L and the incident angle θ are calculable, the intensity value p (u, v) can be obtained using expression (4). It should be noted that a method of determining p (u, v) according to the present embodiment is not limited to the above-described method, and the intensity value p may be determined using, for example, a lookup table showing the relationship between the distance L and the intensity value p of the projection image and the relationship between the incident angle θ and the intensity value p of the projection image. The intensity of projection light that is not projected onto the target object but is projected onto, for example, a background region can be set arbitrarily. For example, a preset fixed value may be used as the intensity. Furthermore, the projection light projected onto the background region may have the same intensity as projection light that is projected onto the target object in a similar emission direction.

In the present embodiment, the amount of projection light is determined based on both of the distance to a point on the target object and the incident angle of projection light with respect to a surface of the target object at this point. Alternatively, the amount of projection light may be determined using one of them. For example, in the case where the distance to the target object is substantially constant, the intensity value corresponding to the incident angle of the projection light may be obtained using a fixed value as the distance to the target object. On the other hand, in the case where the normal direction of a surface of the target object is substantially constant, the intensity value corresponding to the distance to the target object may be obtained using a fixed value as the incident angle of the projection light.

In step S204, the distance measurement unit 111 controls the projection apparatus 130 to project the projection image including the distance measurement pattern in accordance with the amount of projection light determined in step S203. More specifically, the intensity value of a pixel in the projection image corresponding to the direction of projection of light is determined in accordance with the amount of projection light determined in step S203. For example, in the case where a binary pattern composed of white pixels and black pixels is used as the distance measurement pattern, the intensity value of a white pixel located at coordinates (u, v) can be regarded as p (u, v), and the intensity value of a black pixel located at coordinates (u, v) can be regarded as 0. On the other hand, in the case where a multi-value pattern is used as the distance measurement pattern, the projection image can be generated such that, for example, the intensity value corresponding to the largest value is p (u, v).

The distance measurement unit 111 then obtains the image captured by the image capturing apparatus 120, which includes the projection image. The distance measurement unit 111 further triangulates the distance to the target object based on a correspondence relationship between the image captured by the image capturing apparatus 120 and the distance measurement pattern included in the projection image. The distance measurement pattern is not limited to a specific pattern as long as it enables detection of the location of the pattern in the captured image. Any conventional method may be used to obtain a specific structure of the distance measurement pattern and the distance. For example, an image showing slits formed by arranging straight lines at an equal interval, an image showing belt-like stripes, or an image in which codes are embedded at respective portions may be used as the distance measurement pattern.

In the present embodiment, it is assumed that the shape model of the target object, as well as the approximate location and orientation of the target object relative to the projection apparatus, is known in advance. In this case, it is possible to obtain the distance from the optical center of the projection apparatus to a surface of the target object, as well as the incident angle of the projection light with respect to the surface of the target object. Furthermore, the relationship between the amount of projection light and the amount of reflected light can be described using a mathematical expression that includes the distance to the projection surface of the target object and the incident angle as parameters. In the present embodiment, the amount of projection light is calculated in accordance with this relationship based on the distance to the projection surface of the target object and on the incident angle, such that the amount of reflected light is equal to a predetermined light amount.

With the method according to the present embodiment, the amount of projection light can be increased for the direction in which the amount of reflected light is small because, for example, the projection light reaches a faraway surface or the incident angle of light is large, whereas the amount of projection light can be decreased for the direction in which the amount of reflected light is large. Due to such characteristics, a high-contrast image of a distance measurement pattern can be included in a captured image, and stable and high-accuracy distance measurement can be realized.

Second Embodiment

In a second embodiment, similarly to the first embodiment, the amount of projection light is determined for each of the travelling directions of light in accordance with the distance to a projection surface of a target object and the incident angle. While the distance and the incident angle are calculated from the shape model, location and orientation of the target object in the first embodiment, the distance and the incident angle are calculated from distance information of the target object in the second embodiment. The distance information is three-dimensional point group data indicating approximate values of distances from a predetermined reference point, such as a projection apparatus, to points on the target object, and can be generated from, for example, a distance image. In the present embodiment, the distance to a projection surface of the target object on which the projection light is incident and the incident angle are calculated based on the distance information.

Figure 3:
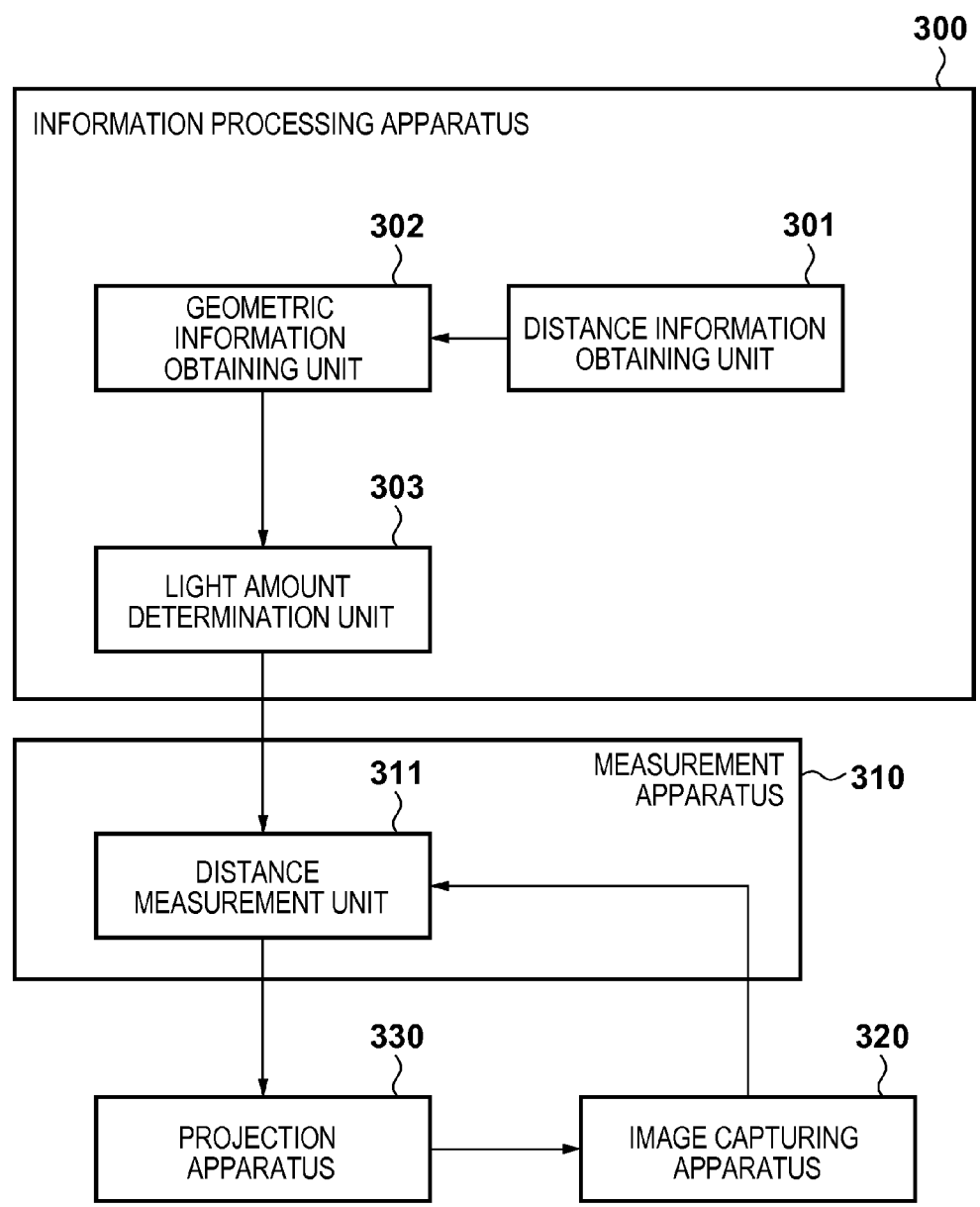
FIG. 3 shows a configuration of an information processing apparatus according to a second embodiment.

FIG. 3 shows a configuration of an information processing apparatus 300 according to the present embodiment. The information processing apparatus 300 includes a distance information obtaining unit 301, a geometric information obtaining unit 302, and a light amount determination unit 303. Also, the information processing apparatus 300 is connected to a measurement apparatus 310. This measurement apparatus 310 includes a distance measurement unit 311. Also, the measurement apparatus 310 is connected to an image capturing apparatus 320 and a projection apparatus 330. The measurement apparatus 310 may include the information processing apparatus 300, or include at least one of the image capturing apparatus 320 and the projection apparatus 330. The light amount determination unit 303, the distance measurement unit 311, the image capturing apparatus 320 and the projection apparatus 330 are configured in a manner similar to the first embodiment, and a description thereof will be omitted below.

The distance information obtaining unit 301 obtains distance information of the target object relative to the projection apparatus 330. In the present embodiment, the distance information obtaining unit 301 obtains three-dimensional point group data. The three-dimensional point group data indicates information of approximate three-dimensional locations of a plurality of points on the target object. This three-dimensional point group data can be generated from, for example, a distance image. In the present embodiment, it is assumed that this distance information is known in advance, and the distance information obtaining unit 301 can obtain the distance information known in advance. For example, the three-dimensional point group data can be obtained through preliminary measurement in which the projection apparatus 330 projects a pattern image of a predetermined intensity value onto the target object and the distance measurement is performed based on information of an image captured by the image capturing apparatus 320. The three-dimensional point group data relative to the image capturing apparatus 320 can be obtained if the three-dimensional point group data is calculated in the above manner. The three-dimensional point group data relative to the image capturing apparatus 320 can be converted into three-dimensional point group data relative to the projection apparatus 330 based on the relative locations and orientations of the image capturing apparatus 320 and the projection apparatus 330. As another method of generating the distance information, the distance information may be generated by stereo matching using two image capturing apparatuses, that is to say, the image capturing apparatus 320 and another image capturing apparatus.

Similarly to the first embodiment, the geometric information obtaining unit 302 calculates the distance from the optical center or the location of the principal point of the projection apparatus 330 to a point on the target object on which the projection light is incident, as well as the incident angle of the projection light with respect to a surface of the target object at this point. In the present embodiment, the geometric information obtaining unit 302 calculates the distance and the incident angle for each of the travelling directions of the projection light using the distance information obtained by the distance information obtaining unit 301. In this manner, in the present embodiment, the geometric information obtaining unit 302 can calculate geometric information based on the distance information.

A description is now given of a processing procedure according to the present embodiment with reference to the flowchart of FIG. 2. In step S201, as an initialization operation, data necessary for processing according to the present embodiment is obtained. The geometric information obtaining unit 302 obtains distance information from the distance information obtaining unit 301. Furthermore, the light amount determination unit 303 obtains internal parameters of both of the image capturing apparatus 320 and the projection apparatus 330, as well as relative locations and orientations thereof.

In step S202, based on the distance information obtained in step S201, the geometric information obtaining unit 302 obtains the distance to a point on the target object on which the projection light is incident, as well as a normal direction of a surface of the target object at this point. More specifically, the geometric information obtaining unit 302 first generates a polygon model by connecting between adjacent points out of the points whose locations are identified by the distance information. This process can be executed in accordance with conventional techniques. Next, for each pixel in a projection image projected by the projection apparatus 330, the geometric information obtaining unit 302 calculates coordinates of a point of intersection between a straight line extending in the corresponding travelling direction of the projection light and a surface of the polygon model. Then, the geometric information obtaining unit 302 obtains a value of the distance from the optical center of the projection apparatus 330 to the coordinates of the point of intersection, as well as a normal direction of the surface at the point of intersection. Furthermore, in accordance with the obtained normal direction and the incident direction of the projection light with respect to this point of intersection, the geometric information obtaining unit 302 obtains the angle at which the projection light is incident with respect to the normal direction (incident angle). The geometric information obtaining unit 302 executes this process for each of the travelling directions of the projection light, that is to say, for each pixel in the projection image projected by the projection apparatus 330.

A method of calculating the distance and the incident angle is not limited to the above-described method. For example, the geometric information obtaining unit 302 may divide a three-dimensional space into a plurality of subregions and apply plane fitting to the three-dimensional point groups belonging to the respective subregions so as to obtain an equation expressing a plane on a per-subregion basis. In this case, the geometric information obtaining unit 302 can obtain the distance to a point on the target object and the incident angle for each of the travelling directions of the projection light, similarly to the case of using the polygon model, by calculating coordinates of a point of intersection between the plane and the projection light.

The processes of steps S203 and S204 can be executed in a manner similar to the first embodiment.

According to the present embodiment, similarly to the first embodiment, a high-contrast image of a distance measurement pattern can be included in a captured image, and stable and high-accuracy distance measurement can be realized.

Third Embodiment

In the first and second embodiments, it is assumed that a target object is a diffuse reflection object. In other words, in these embodiments, it is assumed that reflected light obtained as a result of incident light diffuses evenly regardless of the outgoing direction. In a third embodiment, it is assumed that a target part is a specular object. A specular object, such as a glossy plastic or metallic object, exhibits surface reflection and hence has gloss of different intensities depending on the angle at which a target part is observed. That is to say, in the case of a specular object, the light amount differs depending on the direction of reflected light. In view of this, in the third embodiment, the amount of projection light is determined by further taking the location and orientation of an image capturing apparatus into consideration.

FIG. 1 shows a configuration of an information processing apparatus 100 according to the present embodiment. The information processing apparatus 100 according to the present embodiment is similar to the information processing apparatus according to the first embodiment in terms of configuration. In the present embodiment, a light amount determination unit 104 determines the amount of projection light in accordance with a light reflection model of a specular object based on information indicating the distance to a point on a target object, the incident angle, and the location and orientation of an image capturing apparatus 120.

First, a description is given of a reflection model of a diffuse reflection object. In the case of a specular object, light reflecting in the specular direction with respect to incident light has the largest light amount, and the more the reflected light deviates from the specular direction, the less intense it becomes. In view of this, in the present embodiment, the amount of projection light is determined in accordance with the specular direction of projection light projected onto the measurement target in an incident region of the projection light, and the reflection direction of reflected light from the incident region to the image capturing apparatus. As will be described later, this specular direction can be determined based on the incident direction of the projection light with respect to the measurement target. Hereinafter, an angle formed by the specular direction and the reflection direction is referred to as a reflection deviation angle $\gamma$. The light amount of reflected light decreases as $\gamma$ increases. The relationship between the amount of projection light P incident on the specular object and the amount of corresponding reflected light R can be expressed by the following expression (5) called the Phong reflection model.

[Math 5]

$$R = \frac{W(\theta) \cdot \cos^n \gamma}{L^2} \cdot P \quad (5)$$

In expression (5), P is the light amount of projection light, $\gamma$ is the reflection deviation angle, R is the light amount of reflected light toward a direction that realizes the reflection deviation angle $\gamma$, L is the distance from a point light source to a projection surface, and $\theta$ is the incident angle of the projection light. Furthermore, n and W ($\theta$) are parameters unique to the target object, n being a value indicating the gloss sharpness, and W ($\theta$) being a constant obtained by multiplying the specular reflectivity by the attenuation rate with respect to the distance L.

Similarly to the first embodiment, it will be assumed that the light amount of the projection light P is proportional to the intensity value p of a projection image projected by a projection apparatus 130, and the light amount of the reflected light R is proportional to the intensity value r of an image captured by the image capturing apparatus 120. In this case, expression (5) can be transformed into expression (6) by substituting p and r for P and R, respectively.

[Math 6]

$$r = \frac{w(\theta) \cdot \cos^n \gamma}{L^2} \cdot p \quad (6)$$

In expression (6), w ($\theta$) is a function corresponding to W ($\theta$) in expression (5). As indicated by expression (6), the intensity value r of the reflected light changes depending on the reflection deviation angle $\gamma$. Therefore, in the present embodiment, a geometric information obtaining unit 103 calculates the reflection deviation angle $\gamma$ of the reflected light from a point on the target object toward the image capturing apparatus 120, in addition to the distance to the point on the target object and the incident angle. In the present embodiment, the distance and direction to a point on the target object relative to the projection apparatus 130, as well as the distance and direction to the image capturing apparatus 120 relative to the projection apparatus 130, are known in advance. Therefore, the direction from a point on the target object on which the projection light is incident toward the image capturing apparatus 120 is calculable. Furthermore, as a normal direction of a point on the target object on which the projection light is incident and the direction (incident direction) to the point on the target object relative to the projection apparatus 130 are also known in advance, the specular direction at the point on the target object is also calculable. The geometric information obtaining unit 103 obtains the specular direction and the reflection deviation angle $\gamma$ for each of the travelling directions of the projection light in accordance with the incident direction and the normal direction with respect to the target object.

In the present embodiment, predetermined values recorded in a memory (not shown) provided in the information processing apparatus 100 are used as the function w ($\theta$) and the constant n in expression (6). These function w ($\theta$) and constant n can be determined in advance using an object made of the same material as the target object, or an object that is similar to the target object in terms of reflection characteristics (hereinafter referred to as a reference object 2). That is to say, the projection apparatus 130 projects a projection image of a predetermined intensity value onto the reference object 2, and the image capturing apparatus 120 captures images of the reference object 2 onto which the projection image has been projected. More specifically, in the state where the incident angle $\theta$ of the projection light projected by the projection apparatus 130 onto the reference object 2 is fixed, the image capturing apparatus 120 captures a plurality of images while changing the distance between the projection apparatus 130 and the reference object 2. The constant n can be determined in accordance with expression (6) using a set of the intensity values p of the projection image, the intensity values r of the captured images, the distances L between the projection apparatus 130 and the reference object 2, and the reflection deviation angles γ thus obtained. For example, the constant n can be determined such that w (θ) calculated in accordance with expression (6) has the same value, or error in w (θ) is minimized, for different distances L.

Next, the projection apparatus 130 projects a projection image of a predetermined intensity value onto the reference object 2 while changing the incident angle θ of light projected by the projection apparatus 130 onto the reference object 2, and the image capturing apparatus 120 captures images of the reference object 2 onto which the projection image has been projected. The measurement may be performed while changing parameters other than the incident angle θ, such as the distance L. From the result of this observation, the values of w (θ) corresponding to the incident angles θ of the projection light can be calculated. The relationship between θ and w (θ) thus obtained is recorded in a memory (not shown) provided in the information processing apparatus 100 as, for example, a table. The values of w (θ) corresponding to θ can be obtained by referring to this table.

Similarly to the first embodiment, the intensity value of a pixel at coordinates (u, v) in the projection image projected by the projection apparatus 130 is noted as p (u, v). Also, it will be assumed that the reflected light obtained as a result of reflection of the projection light corresponding to the pixel at coordinates (u, v) on the target object is observed by the image capturing apparatus 120 as a pixel with an intensity value of r (u, v). In this case, expression (7) can be derived from expression (6).

[Math 7]

$$r(u, v) = \frac{w(\theta(u, v)) \cdot \cos^n(\gamma(u, v))}{L(u, v)^2} \cdot p(u, v) \quad (7)$$

Similarly to the first embodiment, the intensity value p (u, v) of the projection image for making the intensity value observed by the image capturing apparatus 120 equal to a predetermined value N can be obtained in accordance with equation (8), which is derived from transformation of expression (7).

[Math 8]

$$p(u, v) = \frac{L(u, v)^2}{w(\theta(u, v)) \cdot \cos^n(\gamma(u, v))} \cdot N \quad (8)$$

The following describes processing according to the present embodiment with reference to the flowchart of FIG. 2. The process of step S201 is executed in a manner similar to the first embodiment. In step S202, similarly to the first embodiment, the geometric information obtaining unit 103 obtains the distance and the incident angle for each of the travelling directions of the projection light. In the present embodiment, the geometric information obtaining unit 103 further obtains the above-described reflection deviation angle γ for each of the travelling directions of the projection light.

In step S203, the light amount determination unit 104 determines the intensity value r (u, v) of each pixel in the projection image in a manner similar to the first embodiment, except that expression (8) is used in place of expression (4). The parameters n and w (θ (u, v)) used here are determined in advance, as stated earlier. The process of step S204 is executed in a manner similar to the first embodiment.

In the present embodiment, the reflection direction from a point on the target object to the image capturing apparatus 120 is obtained in accordance with the location of the image capturing apparatus 120, and the reflection deviation angle γ is obtained in accordance with the obtained reflection direction and the specular direction. As another calculation method, the reflection deviation angle γ may be obtained using the orientation of the image capturing apparatus 120 in place of the location of the image capturing apparatus 120. For example, it can be considered that reflected light travelling parallel to the direction of the optical axis of the image capturing apparatus 120 is incident on the image capturing apparatus 120. In this case, an angle formed by the direction of the optical axis of the image capturing apparatus 120 determined in accordance with the orientation of the image capturing apparatus 120 (line-of-sight direction) and the specular direction at a point on the target object can be obtained as the reflection deviation angle γ (u, v). By using such approximation, the amount of projection light can be determined with a smaller amount of calculation.

According to the present embodiment, the amount of projection light is set in accordance with the gloss of the target object. Therefore, even if a surface of the target object exhibits specular reflection, a high-contrast image of a distance measurement pattern can be included in a captured image, and stable and high-accuracy distance measurement can be realized.

Modification Example of Third Embodiment

In the third embodiment, it is assumed that a target object is a specular object. In the present modification example, it is assumed that a target object has both diffuse reflection characteristics and specular reflection characteristics. In this case, the relationship between projection light and reflected light can be expressed by expression (9), which is derived from the combination of expressions (3) and (7).

[Math 9]

$$r(u, v) = \left(\frac{k \cdot \cos(\theta(u, v)) + w(\theta(u, v)) \cdot \cos^n(\gamma(u, v))}{L(u, v)^2}\right) \cdot p(u, v) \quad (9)$$

In expression (9), a constant k, a function w (θ) and a constant n are determined in advance and recorded in a memory (not shown) provided in the information processing apparatus 100. These constant k, function w (θ) and constant n can be obtained in a manner similar to the third embodiment. That is to say, in the state where the incident angle of the projection light with respect to a reference object is fixed, the reflected light is observed while changing the distance between the reference object and the projection apparatus 130. Unknowns k and n can be derived from a plurality of expressions obtained by substituting a set of the intensity values r of captured images, the intensity values p of a projection image, the distances L, the incident angle θ, and the reflection deviation angles γ into expression (9).

Next, the image capturing apparatus 120 observes the intensity value of the reflected light while changing the incident angle of the projection light with respect to the reference object and the distance between the reference object and the projection apparatus 130. From the result of the observation, the relationship between values of w (θ) corresponding to the incident angles θ can be obtained in accordance with equation (9). This relationship can be recorded in a memory (not shown) provided in the information processing apparatus 100 as a table.

The intensity value p (u, v) of the projection image for making the intensity value observed by the image capturing apparatus 120 equal to a predetermined value N can be obtained in accordance with equation (10), which is derived from transformation of expression (9).

[Math 10]

$$p(u, v) = \frac{L(u, v)^2}{k \cdot \cos(\theta(u, v)) + w(\theta(u, v)) \cdot \cos^n(\gamma(u, v))} \cdot N \quad (10)$$

Fourth Embodiment

In the first to third embodiments, it is assumed that a target object has uniform reflection characteristics. For example, in the first embodiment, the amount of projection light is determined using the same constant k for any point on a target object. In the third embodiment, the amount of projection light is determined using the same constant n and function w for any point on a target object. In the fourth embodiment, a description is given of a method of determining the amount of projection light in the case where reflection characteristics of a target object differ depending on the projection surface, for example, in the case where a plurality of target objects exist, or in the case where different portions of a target object have different reflection characteristics.

In the present embodiment, reflection characteristics (for example, a constant k, or a constant n and a function w) are measured and prepared in advance for each target object, for each portion of a target object, or for each material of a target object. In the following description, it is assumed that reflection characteristics, that is to say, information indicating the magnitude of the reflectance is determined in advance for each portion of a target object. Respective portions of the target object are assigned IDs for identifying corresponding reflection characteristics in advance.

In step S202 according to the present embodiment, a geometric information obtaining unit 103 obtains reflection characteristics of a point on the target object, in addition to the distance to the point on the target object and the incident angle. For example, the geometric information obtaining unit 103 identifies a portion of the target object including a surface on which the projection light is incident, and obtains the ID of this portion.

In step S203, a light amount determination unit 104 obtains, from a memory (not shown) provided in an information processing apparatus 100, information indicating the reflection characteristics corresponding to the ID obtained by the geometric information obtaining unit 103. Then, using the obtained information indicating the reflection characteristics, the amount of projection light is determined in a manner similar to the first to third embodiments.

According to the present embodiment, in the case where a plurality of target objects exist, or in the case where different portions of a target object have different reflection characteristics, reflection characteristics used in calculation are switched in accordance with a portion onto which the projection light is projected. In this way, the amount of projection light can be calculated in concert with differences in reflection characteristics of various portions of the target object. As a result, reflection of a projection image of a distance measurement pattern can be controlled to realize high contrast, and stable and high-accuracy distance measurement can be realized.

Fifth Embodiment

In the first embodiment, the amount of projection light is determined in accordance with the relationship between the location of a projection apparatus and the location of a target object. In the fifth embodiment, a description is given of a method of determining the amount of projection light further in consideration of ambient light. Ambient light is light from light sources other than a projection apparatus, and includes, for example, light from an indoor fluorescent lamp and outdoor sunlight. Under the condition where the ambient light exists, not only the projection light from the projection apparatus but also the ambient light is incident on the target object. As a result, an image capturing apparatus observes both of reflected light derived from the projection light and reflected light derived from the ambient light. In the present embodiment, the amount of projection light is determined such that a sum of the amount of reflected light derived from the projection light and the amount of reflected light derived from the ambient light falls within the dynamic range of the image capturing apparatus. In the present embodiment, it is assumed that a shape model of a target object is known in advance similarly to the first embodiment, and the amount of projection light is determined based on the location and orientation of the target object and on the ambient light.

Figure 5:
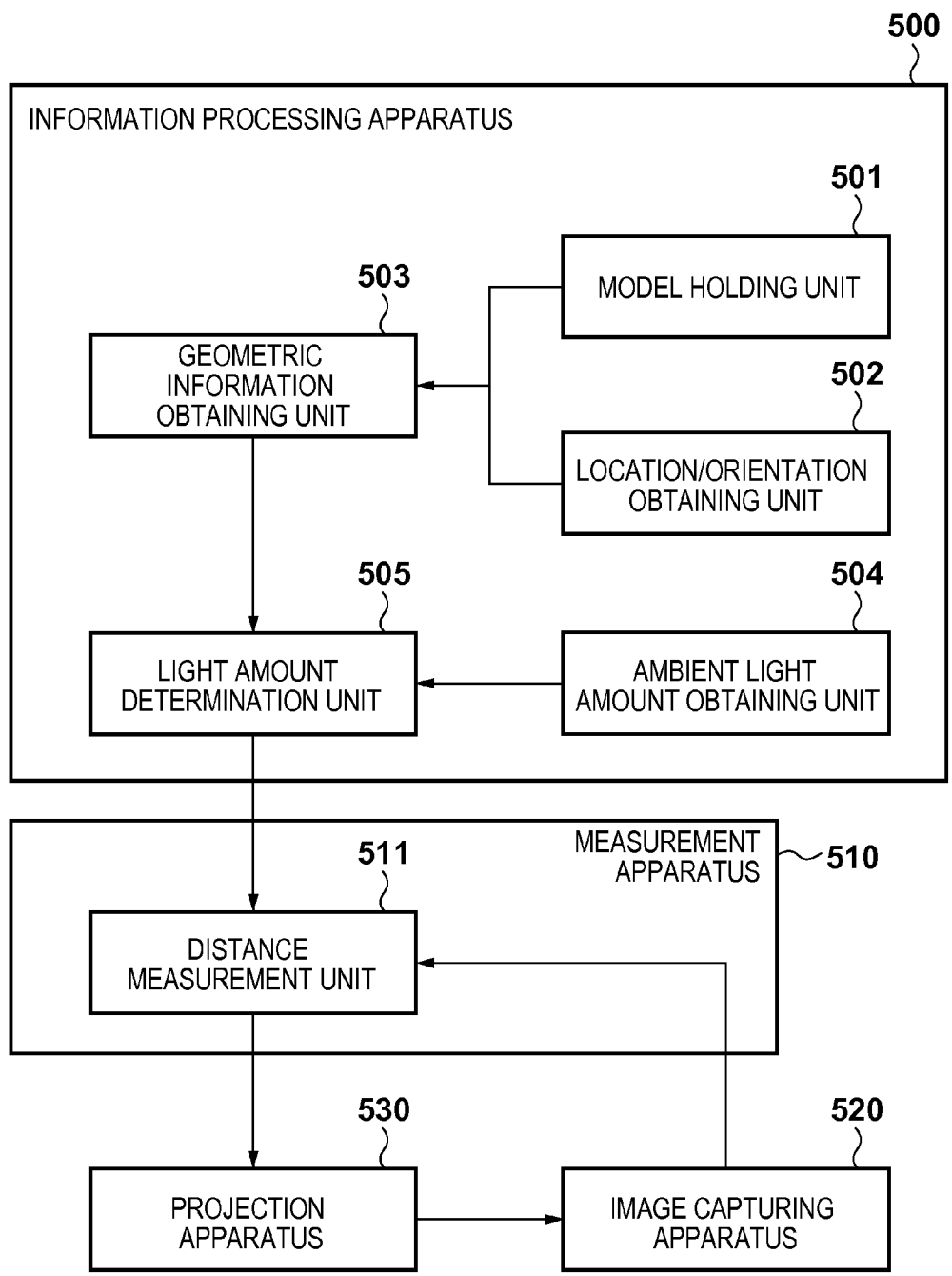
FIG. 5 shows a configuration of an information processing apparatus according to a fifth embodiment.

FIG. 5 shows a configuration of an information processing apparatus 500 according to the present embodiment. The information processing apparatus 500 includes a model holding unit 501, a location/orientation obtaining unit 502, a geometric information obtaining unit 503, an ambient light amount obtaining unit 504, and a light amount determination unit 505. Also, the information processing apparatus 500 is connected to a measurement apparatus 510. This measurement apparatus 510 includes a distance measurement unit 511. Furthermore, the measurement apparatus 510 is connected to an image capturing apparatus 520 and a projection apparatus 530. The measurement apparatus 510 may include the information processing apparatus 500, or include at least one of the image capturing apparatus 520 and the projection apparatus 530. The model holding unit 501, the location/orientation obtaining unit 502, the geometric information obtaining unit 503, the distance measurement unit 511, the image capturing apparatus 520, and the projection apparatus 530 are configured in a manner similar to the first embodiment, and a description thereof will be omitted below.

The ambient light amount obtaining unit 504 obtains the amount of light derived from ambient light observed by the image capturing apparatus 520. This amount of light is determined in advance and stored in a memory (not shown) provided in the information processing apparatus 500. In the present embodiment, the ambient light amount obtaining unit 504 obtains the amount of light derived from ambient light for each of directions corresponding to pixels in a captured image. The amount of light derived from ambient light can be measured, for example, by the image capturing apparatus 520 capturing an image of the target object under the condition where light is not being projected by the projection apparatus 530. In this case, the intensity value of each pixel in the captured image obtained by the image capturing apparatus 520 can be used as the amount of light derived from ambient light. As another method, a user may set the amount of light derived from ambient light under the assumption that a predetermined amount of ambient light is incident on the image capturing apparatus 520. For example, a fixed value may be set as the amount of light derived from ambient light for each pixel in the captured image.

The light amount determination unit 505 determines the amount of projection light for each of the travelling directions based on the distance to a point on the target object and the incident angle calculated by the geometric information obtaining unit 503 and on the amount of light derived from ambient light obtained by the ambient light amount obtaining unit 504, such that a predetermined amount of reflected light is obtained from a projection image.

A description is now given of a processing procedure according to the present embodiment with reference to a flowchart of FIG. 6. In step S601, the geometric information obtaining unit 503 performs an initialization operation similarly to step S201 according to the first embodiment. In step S602, the geometric information obtaining unit 503 determines the distance to a point on a target object and the incident angle similarly to step S202 according to the first embodiment.

In step S603, the ambient light amount obtaining unit 504 obtains the light amount of reflected light that is derived from ambient light and is reflected by the target object toward the image capturing apparatus 520. Below, the intensity value corresponding to the light amount of reflected light that is derived from ambient light and comes from the direction corresponding to coordinates (x, y) in an image captured by the image capturing apparatus 520 is noted as e (x, y).

In step S604, the light amount determination unit 505 determines the amount of projection light based on the distance to the point on the target object, the incident angle, and the amount of light derived from ambient light, such that the amount of reflected light from the projection image is equal to a predetermined light amount. A method of determining the amount of projection light will be described below in detail.

It will be assumed that the light amount of reflected light that is derived from light projected in the direction corresponding to coordinates (u, v) in the projection image and is reflected by a surface of the target object is observed as the intensity value at coordinates (u', v') in the captured image. These coordinates (u', v') in the captured image are obtained by re-projecting a three-dimensional location on the target object that corresponds to coordinates (u, v) in the projection image and on which the projection light is incident into a coordinate system of the captured image. For example, after obtaining the direction of a point on the target object which corresponds to coordinates (u, v) and on which the projection light is incident with respect to the direction of the optical axis of the image capturing apparatus, the obtained direction can be converted into coordinates (u', v') in accordance with the angle of view of the image capturing apparatus.

If there is no ambient light, the intensity value of the projection light can be determined in accordance with expression (5). In the present embodiment, the amount of projection light is determined such that a sum of the light amount of reflected light derived from projection light and the light amount of reflected light derived from ambient light falls within a predetermined range. This predetermined range may be, for example, the dynamic range of the image capturing apparatus 520. More specifically, the amount of projection light can be determined such that a sum of the intensity value e (u', v') of reflected light derived from ambient light and the intensity value of reflected light derived from the projection light at coordinates (u', v') in the captured image does not exceed the upper limit value M of the dynamic range of the image capturing apparatus 520. In other words, the upper limit of the intensity value of reflected light derived from the projection light at coordinates (u', v') in the captured image is M−e (u', v').

In the present embodiment, in order to obtain the projection image with the highest possible contrast, the upper limit value, M−e (u', v'), is used as the intensity value N of reflected light derived from the projection light. In this case, the intensity value of coordinates (u, v) in the projection image can be obtained in accordance with expression (11), which is obtained by substituting M−e (u', v') for N in expression (5).

[Math 11]

$$p(u, v) = \frac{L(u, v)^2}{k \cdot \cos(\theta(u, v))} \cdot (M - e(u', v'))  \qquad (11)$$

In step S604 according to the present embodiment, for each set of coordinates (u, v) in the projection image, corresponding coordinates (u', v') in the captured image are obtained in the above-described manner and the corresponding intensity value is determined in accordance with equation (11). If the target object does not exist in the direction corresponding to coordinates (u, v) in the projection image, the intensity value of the projection image is determined similarly to the process of step S203 according to the first embodiment.

In step S605, similarly to step S204 according to the first embodiment, the distance measurement unit 511 projects the projection image in accordance with the intensity value determined in step S504 and measures the distance to the target object.

According to the present embodiment, the amount of projection light is determined in consideration of the incidence of reflected light derived from ambient light on the image capturing apparatus. For example, by setting the amount of projection light such that the amount of reflected light toward the image capturing apparatus falls within the dynamic range, saturation of the light amount observed by the image capturing apparatus can be avoided. Therefore, even if reflected light derived from ambient light is incident on the image capturing apparatus, reflection of a projection image of a distance measurement pattern can be controlled to realize high contrast, and stable and high-accuracy distance measurement can be realized.

While the present embodiment has provided a description of a method that takes ambient light into consideration on the basis of the first embodiment, a similar method is applicable also to the second to fourth embodiments. That is to say, in the second to fourth embodiments, by further providing an ambient light amount obtaining unit and determining the upper limit of the amount of reflected light derived from projection light in accordance with the amount of reflected light derived from ambient light, the amount of projection light can be determined such that the projection image is captured within the dynamic range.

Sixth Embodiment

The distance measurement methods according to the first to fifth embodiments can be used in controlling a robotic arm. In a sixth embodiment, an industrial robotic arm is controlled to grip a target object using the result of distance measurement according to the distance measurement methods according to the first to fifth embodiments.

Figure 4:
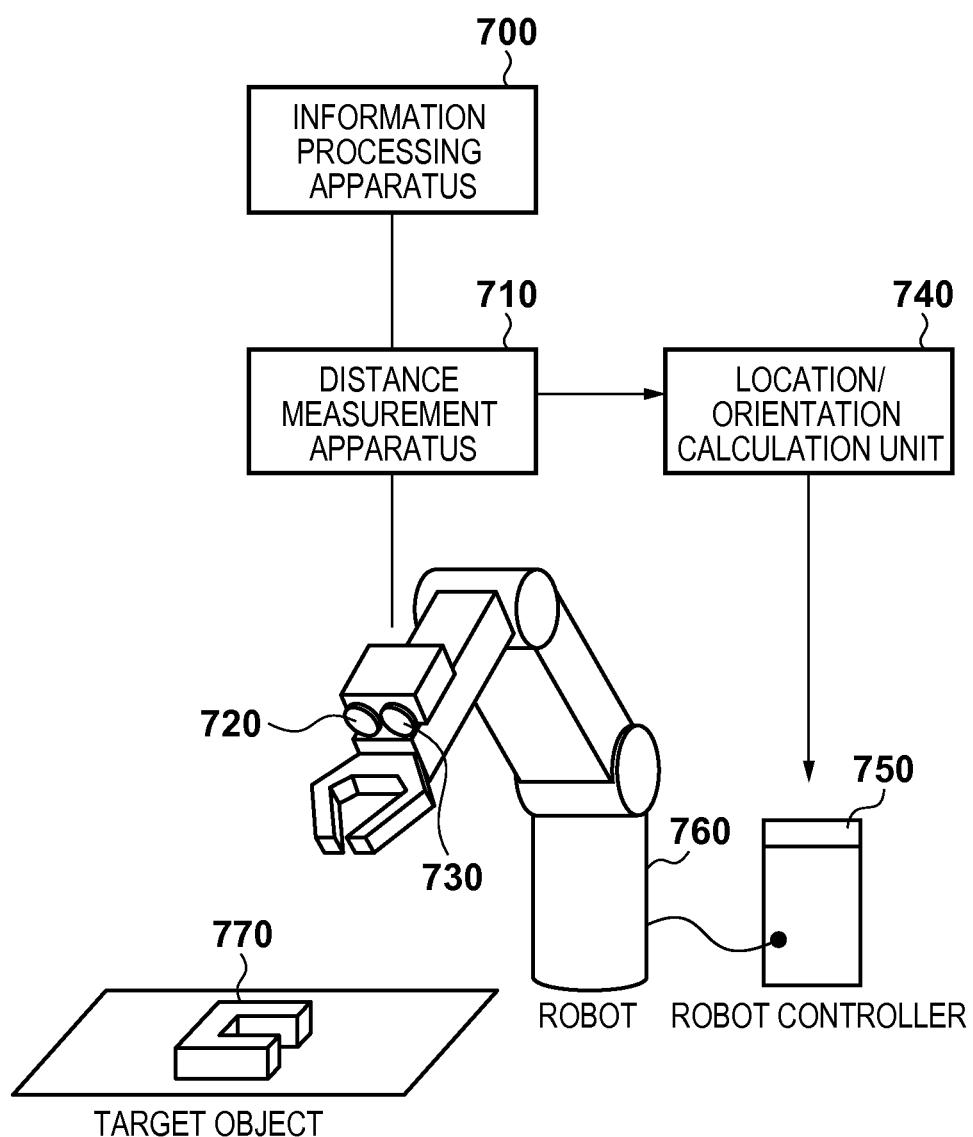
FIG. 4 shows a configuration of a robot control system according to a sixth embodiment.

FIG. 4 shows a configuration of a robot control system according to the present embodiment. An image capturing apparatus 720 and a projection apparatus 730 are mounted on an arm of a robot 760 constituting the robot control system. Also, the robot control system is connected to an information processing apparatus 700 and a distance measurement apparatus 710. These information processing apparatus 700, distance measurement apparatus 710, image capturing apparatus 720 and projection apparatus 730 operate in a manner similar to the first to fifth embodiments, and the distance from the image capturing apparatus 720 or the projection apparatus 730 to a target object 770 is measured. The robot control system may include the information processing apparatus 700, the distance measurement apparatus 710, the image capturing apparatus 720 and the projection apparatus 730.

The robot control system according to the present embodiment controls operation of the robot 760 with movable axes in accordance with the distance to the target object 770 measured by the distance measurement apparatus 710. The robot control system includes a location/orientation calculation unit 740 and a robot controller 750. The location/orientation calculation unit 740 calculates the location and orientation of the target object 770 in accordance with the distance to the target object 770 measured by the distance measurement apparatus 710. In accordance with the location and orientation of the target object 770 calculated by the location/orientation calculation unit 740, the robot controller 750 controls the robot 760 such that the robot 760 moves to a predetermined location. A hand representing an end effector is mounted on the tip of the robot 760, and the robot controller 750 causes the hand to move to a designated location and grip the target object 770. It will be assumed that a portion of the target object to be gripped by the hand is designated in advance by a shape model of the target object. The operation of the robot 760 for gripping the target object 770 can be realized by controlling the robot 760 so as to enable the hand to grip the target object based on the location and orientation calculated by the location/orientation calculation unit 740.

The target object 770 is placed on a working table. It will be assumed that the location of the target object 770 on the working table is roughly known. In other words, it will be assumed that the approximate values of the location and orientation of the target object 770 are obtained in advance. Based on the approximate values of the location and orientation of the target object 770, the information processing apparatus 700 determines the amount of projection light in accordance with the first to fifth embodiments such that a projection image is captured with high contrast. In this way, the distance measurement apparatus 710, the image capturing apparatus 720 and the projection apparatus 730 can perform out stable and high-accuracy measurement of the distance to the target object 770.

The location/orientation calculation unit 740 generates a three-dimensional point group indicating locations of points on the target object 770 using distance information calculated by the distance measurement apparatus 710. Then, the location and orientation of the target object 770 are calculated by performing model fitting for positionally fitting a three-dimensional model of the target object 770. A method of calculating the location and orientation of the target object is not limited to the above-described method. For example, the location and orientation of the target object 770 can be calculated by performing pattern matching between a distance image obtained from distance information, which is calculated by the distance measurement apparatus 710 and indicates the distance to the target object 770, and a plurality of distance images that were captured in advance while changing the location and orientation of the target object 770. The location and orientation of the target object 770 shown in one of the distance images captured in advance that exhibits the highest matching rate are used as the current location and orientation of the target object 770. The distance information indicating the distance to the target object 770 or the location and orientation of the target object 770 calculated in the above-described manner may be used as the approximate location and orientation of the target object 770 when the distance measurement apparatus 710 measures the distance to the target object 770 again.

As described above, according to the present embodiment, the operation of gripping the target object and the like can be carried out with high accuracy by controlling the robot in accordance with stable and high-accuracy distance measurement that is achieved in accordance with the first to fifth embodiments.

Other Embodiments

Various methods of determining the amount of projection light have been described in the first to fifth embodiments. These methods of determining the amount of projection light can be used in any combination. For example, the amount of projection light can be determined in consideration of at least one of the following items: the reflectance of a target object that is prepared in advance in correspondence with an incident region of the projection light; the distance from the incident region of the projection light to a projection apparatus; the incident angle of the projection light with respect to the incident region; the reflection angle of the projection light from the incident region to an image capturing apparatus; and the light amounts of ambient light from regions of the target object toward the image capturing apparatus. Even in the case where only a part of these items is taken into consideration, contrast of a projection image can be improved by projecting the projection light whose intensity is controlled for each projection direction, as compared to conventional techniques. For example, in the case where the amount of projection light is calculated using only a part of parameters, the light amount of the projection light is calculated by using other parameters as fixed values that do not change regardless of the travelling direction of the projection light. Furthermore, the amount of projection light may be determined in consideration of other parameters that influence the light amount of reflected light from an incident region of a target object in which the projection light is incident toward an image capturing apparatus.

In the first to fifth embodiments, the amount of projection light is determined for each of the travelling directions of the projection light. For example, the amount of projection light is determined for each pixel in a projection image. However, the amount of projection light may not be determined for all travelling directions or for all pixels. For example, it is permissible to divide a projection image into some blocks in the form of a grid, and calculate the intensity value of the projection image on a block-by-block basis. In this case, for example, it is possible to determine the amount of projection light for a travelling direction corresponding to one pixel in each block, and apply the determined amount of projection light to all pixels in the corresponding block. Also, it is permissible to classify projection directions that are similar to one another in terms of the distance to a surface of the target object and the normal direction of the surface into one group, and calculate the intensity value of a projection image on a group-by-group basis.

Furthermore, the distance measurement pattern projected by the projection apparatus is not limited to a two-dimensional pattern. For example, the projection apparatus may project one-dimensional slit-like light, project light in one certain direction, or scan the measurement target with the projection light. In any case, the amount of projection light can be calculated for each of the travelling directions of light in accordance with the above-described embodiments.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-134203, filed Jun. 26, 2013, which is hereby incorporated by reference herein in its entirety.

What is claimed is:

1. An information processing apparatus comprising:
   a location information obtaining unit configured to obtain location information indicating an approximate location of a measurement target relative to a projection apparatus, wherein the projection apparatus is configured to project, onto the measurement target, projection light of a predetermined pattern composed of light rays travelling in respective directions; and
   a determination unit configured to estimate, for respective travelling directions, incident regions of the measurement target on which the projection light is incident in accordance with the location information, and determine amounts of the projection light toward the respective travelling directions such that light amounts of reflected light from the estimated incident regions toward an image capturing apparatus fall within a predetermined range, wherein the image capturing apparatus is configured to capture an image of the measurement target onto which the projection light has been projected.

2. The information processing apparatus according to claim 1, wherein the determination unit is further configured to determine the amounts of the projection light in accordance with information indicating magnitudes of reflectances of the measurement target at incident locations of the projection light.

3. The information processing apparatus according to claim 1, wherein the determination unit is further configured to determine the amounts of the projection light in accordance with a piece of information indicating a magnitude of reflectance of an incident region corresponding to an incident location of the projection light, selected from pieces of information indicating magnitudes of reflectances that have been prepared in advance for respective regions of the measurement target.

4. The information processing apparatus according to claim 1, wherein the determination unit is further configured to determine the amounts of the projection light in accordance with distances between the incident regions of the projection light and the projection apparatus.

5. The information processing apparatus according to claim 1, wherein the determination unit is further configured to determine the amounts of the projection light in accordance with incident angles of the projection light on the measurement target in the incident regions of the projection light.

6. The information processing apparatus according to claim 1, wherein the determination unit is further configured to determine the amounts of the projection light in accordance with incident angles of the projection light on the measurement target in the incident regions of the projection light, as well as reflection angles of the reflected light from the incident regions toward the image capturing apparatus.

7. The information processing apparatus according to claim 1, further comprising
   an ambient light amount obtaining unit configured to obtain light amounts of reflected ambient light from respective regions of the measurement target toward the image capturing apparatus while the projection light is not being incident, wherein
   the determination unit is further configured to determine the amounts of the projection light toward the respective travelling directions such that a sum of light amounts of reflected projection light and light amounts of reflected ambient light from the incident regions toward the image capturing apparatus falls within the predetermined range.

8. The information processing apparatus according to claim 1, wherein the location information indicates a shape, location and orientation of the measurement target.

9. The information processing apparatus according to claim 1, wherein the location information indicates approximate distances to respective points on the measurement target.

10. An information processing apparatus comprising:
    a location information obtaining unit configured to obtain location information indicating an approximate location of a measurement target relative to a projection apparatus, wherein the projection apparatus is configured to project, onto the measurement target, projection light of a predetermined pattern composed of light rays travelling in respective directions; and a determination unit configured to estimate, for respective travelling directions, incident regions of the measurement target on which the projection light is incident in accordance with the location information, and determine amounts of the projection light toward the respective travelling directions with reference to at least one of reflectances of the measurement target that have been prepared in advance for the incident regions of the projection light, distances from the incident regions of the projection light to the projection apparatus, incident angles of the projection light on the incident regions, reflection angles of the projection light from the incident regions toward the image capturing apparatus, and light amounts of ambient light from respective regions of the measurement target toward the image capturing apparatus, wherein the image capturing apparatus is configured to capture an image of the measurement target onto which the projection light has been projected.

11. A measurement system comprising:
a projection apparatus configured to project, onto a measurement target, projection light of a predetermined pattern composed of light rays travelling in respective directions;
an image capturing apparatus configured to capture an image of the measurement target onto which the projection light has been projected;
a measurement unit configured to measure a distance from the projection apparatus or the image capturing apparatus to the measurement target using the image captured by the image capturing apparatus; and
the information processing apparatus according to claim 1 configured to determine amounts of the projection light from the projection apparatus.

12. A control system comprising:
the measurement system according to claim 11;
a robot with a movable axis; and
a control unit configured to control a location and an orientation of the robot in accordance with a distance measured by the measurement system.

13. An light amount determination method comprising:
obtaining location information indicating an approximate location of a measurement target relative to a projection apparatus, wherein the projection apparatus is configured to project, onto the measurement target, projection light of a predetermined pattern composed of light rays travelling in respective directions;
estimating, for respective travelling directions, incident regions of the measurement target on which the projection light is incident in accordance with the location information; and
determining amounts of the projection light toward the respective travelling directions such that light amounts of reflected light from the estimated incident regions toward an image capturing apparatus fall within a predetermined range, wherein the image capturing apparatus is configured to capture an image of the measurement target onto which the projection light has been projected.

14. A non-transitory computer-readable storage medium storing a program for causing a computer to:
obtain location information indicating an approximate location of a measurement target relative to a projection apparatus, wherein the projection apparatus is configured to project, onto the measurement target, projection light of a predetermined pattern composed of light rays travelling in respective directions;
estimate, for respective travelling directions, incident regions of the measurement target on which the projection light is incident in accordance with the location information; and
determine amounts of the projection light toward the respective travelling directions such that light amounts of reflected light from the estimated incident regions toward an image capturing apparatus fall within a predetermined range, wherein the image capturing apparatus is configured to capture an image of the measurement target onto which the projection light has been projected.

\* \* \* \* \*